(12) United States Patent
Kang et al.

(10) Patent No.: US 9,837,822 B2
(45) Date of Patent: Dec. 5, 2017

(54) CONTROL DEVICE OF ENERGY STORAGE SYSTEM

(71) Applicant: LSIS CO., LTD., Anyang-si, Gyeonggi-do (KR)

(72) Inventors: Byung Kwan Kang, Seoul (KR); Chung Woo Lee, Gwangmyeong-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 235 days.

(21) Appl. No.: 14/814,292

(22) Filed: Jul. 30, 2015

(65) Prior Publication Data

US 2016/0087475 A1    Mar. 24, 2016

(30) Foreign Application Priority Data

Sep. 23, 2014    (KR) .................. 10-2014-0127198

(51) Int. Cl.
*H02J 7/00*    (2006.01)
*H02J 3/32*    (2006.01)
*H02J 3/18*    (2006.01)

(52) U.S. Cl.
CPC ......... *H02J 3/32* (2013.01); *H02J 3/18* (2013.01); *Y02E 40/30* (2013.01)

(58) Field of Classification Search
USPC ........................................................ 320/128
See application file for complete search history.

(56) References Cited

U.S. PATENT DOCUMENTS

2013/0320770 A1* 12/2013 Panosyan ................. G05F 1/70
                                                            307/82

FOREIGN PATENT DOCUMENTS

| JP | 2003284244 | 10/2003 |
|---|---|---|
| JP | 2007124797 | 5/2007 |
| JP | 2010-041883 | 2/2010 |
| JP | 2010114968 | 5/2010 |
| JP | 2012-130146 | 7/2012 |
| JP | 2012130146 | 7/2012 |
| KR | 10-2010-0035269 | 4/2010 |
| KR | 1020100060725 | 6/2010 |
| KR | 10-2012-0100157 | 9/2012 |
| KR | 10-1219799 | 1/2013 |
| KR | 10-1281309 | 7/2013 |
| WO | 2014132371 | 9/2014 |

OTHER PUBLICATIONS

Korean Intellectual Property Office Application Serial No. 10-2014-0127198, Office Action dated Mar. 14, 2016, 5 pages.

* cited by examiner

*Primary Examiner* — Samuel Berhanu
(74) *Attorney, Agent, or Firm* — Lee, Hong, Degerman, Kang & Waimey

(57) ABSTRACT

A control device of an energy storage system is provided. The control device includes a voltage calculation unit calculating the difference between a reference voltage and a measured voltage; frequency calculation unit calculating the difference between a reference frequency and a measured frequency; a power reserve margin (PRM) calculating a ratio of reserve power to the maximum consumption of power; and a power calculation unit using, as input values, coefficients calculated at the voltage calculation unit, the frequency calculation unit and the PRM calculation unit, and calculating a switch control value of an energy storage system by further using a difference in reactive power and active power.

9 Claims, 5 Drawing Sheets

CONTROL DEVICE OF ENERGY STORAGE SYSTEM

CROSS-REFERENCE TO RELATED APPLICATIONS

Pursuant to 35 U.S.C. §119(a), this application claims the benefit of earlier filing date and right of priority to Korean Patent Application No. 10-2014-0127198, filed on Sep. 23, 2014, the contents of which are all hereby incorporated by reference herein in its entirety.

BACKGROUND

The present disclosure relates to a control device of an energy storage system, and more particularly, to a control device of an energy storage system considering a power reserve margin.

When managing a power network, the biggest issue of load usage patterns is a peak load. When a constant load is always used, it is possible to stably supply power because the load is usually applied to a power generation plan. However, when a load representing low power consumption suddenly consumes a lot of power, there may be a limitation in that a power network becomes instable because demand and supply do not match. In this context, there is also a limitation in that a generator needs to always prepare for generating as much as peak power in order to bear the usage of all loads. That is, when generation fails to bear peak consumption, a power network itself may become instable, and when the generation is sufficiently great to be capable of bearing peak consumption, there may be a matter with excessive facility investment.

FIGS. 1 and 2 are block diagrams of a control device of a typical energy storage system.

Referring to FIGS. 1 and 2, the control device of the typical energy storage system calculates a duty ratio for controlling the operation switch of an energy storage system based on active power P, reactive power Q, and the reference values of the active power and reactive power Pref and Qref, and controls the operation of the energy storage system based on the calculated values.

The control device of the energy storage system in FIG. 2 is configured by adding a droop controller to the control device in FIG. 1. That is, by adding the droop controller to a controller based on active power and reactive power in FIG. 1, the control device performs a method of calculating a control coefficient by further using a voltage and frequency. It is possible to use reactive power and active power constants, and voltage and frequency constants capable of being calculated at the droop controller to calculate a switching control coefficient based on reactive power, active power, frequency and voltage values to control a switch for the operation of the energy storage system.

Since the operation control of the energy storage system according to the above-described method is a configuration for controlling the charging and discharging of the energy storage system based on coefficient values simply, there is a limitation in that it is difficult to prepare for power shortage capable of occurring in a particular season or an error in power supply. Also, there is a limitation in calculating the control coefficient for the operation of the control device for energy charging and discharging operations depending on the time zone or the situation.

SUMMARY

Embodiments provide a control device for controlling an efficient energy storage system applying a power reserve margin to peak power consumption.

In one embodiment, control device includes a voltage calculation unit calculating the difference between a reference voltage and a measured voltage; frequency calculation unit calculating the difference between a reference frequency and a measured frequency; a power reserve margin (PRM) calculation unit calculating a ratio of reserve power to the maximum consumption power; and a power calculation unit using, as input values, coefficients calculated at the voltage calculation unit, the frequency calculation unit and the PRM calculation unit, and calculating a switch control value of an energy storage system by further using a difference in reactive power and active power.

The details of one or more embodiments are set forth in the accompanying drawings and the description below. Other features will be apparent from the description and drawings, and from the claims.

DETAILED DESCRIPTION OF THE EMBODIMENTS

Figure 1:
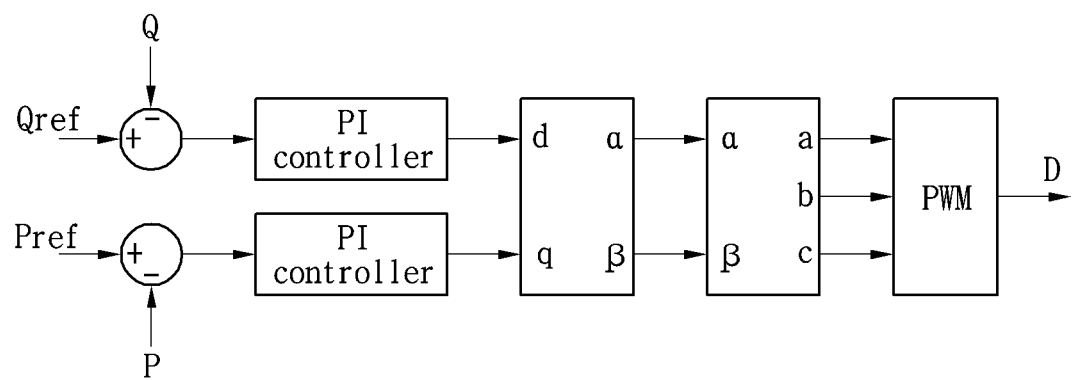
FIGS. 1 and 2 are block diagrams of a control device of a typical energy storage system.

The terms or words used in the detailed description and claims should not be imitatively construed as typical meanings or meanings indicated in dictionaries but should be construed as meanings and concepts matching the technical spirit of the inventive concept based on the principle that the inventor may properly define the concepts of terms in order to describe his or her invention in the best mode.

Thus, since embodiments described in the detailed description and configurations shown in the drawings are only examples and do not cover all the technical spirits of an embodiment, it should be understood that there may be various equivalents and variations that may replace them upon filing the present application.

Figure 3:
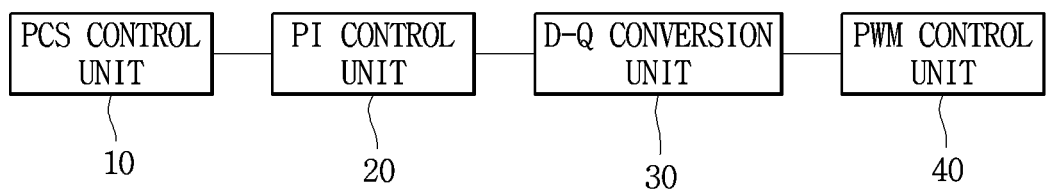
FIG. 3 is a block diagram of a control device of an energy storage system according to an embodiment.
Figure 4:
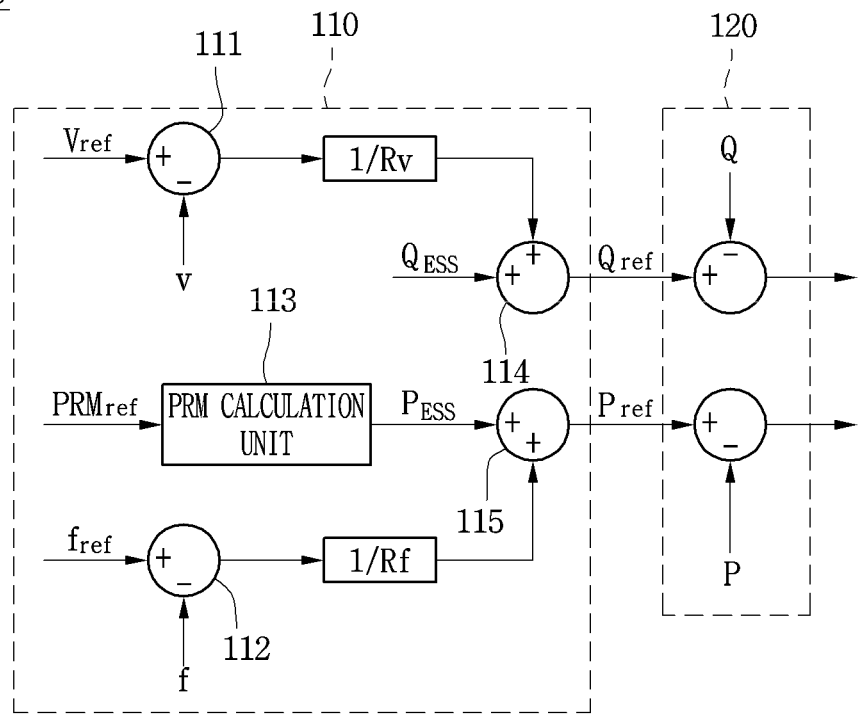
FIG. 4 is a block diagram of a power conversion system (PCS) control unit of an energy storage system according to an embodiment.
Figure 5:
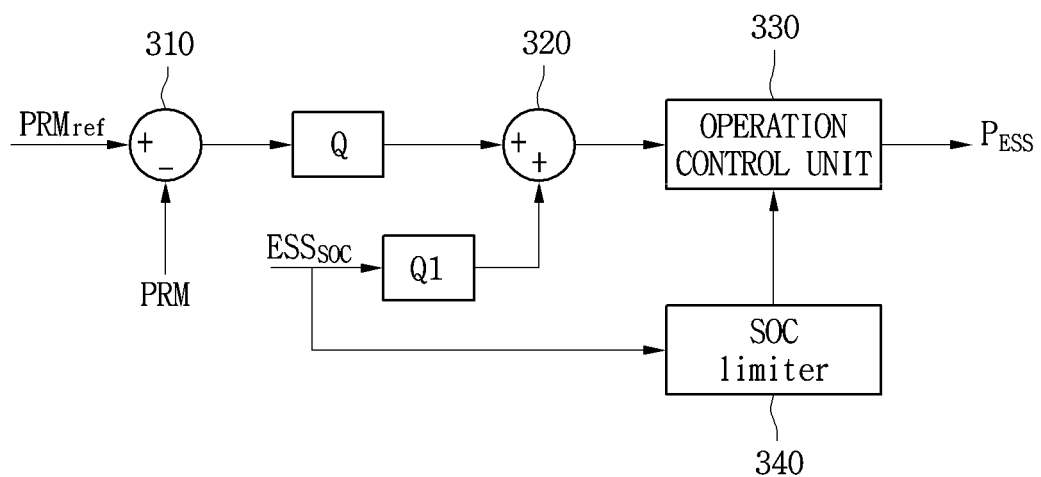
FIG. 5 is a block diagram of a charging and discharging device of an energy storage system according to an embodiment.

FIG. 3 is a block diagram of a control device of an energy storage system according to an embodiment, and FIG. 4 is a block diagram of a power conversion system (PCS) control unit of an energy storage system according to an embodiment.

Referring to FIGS. 3 and 4, an energy storage system according to an embodiment may include a PCS control unit 10, a PI control unit 20, a d-q conversion unit 30, and a PWM control unit 40.

The PCS control unit 10 may calculate a control value for the charging and discharging of the energy storage system based on power information including active power and reactive power and certain input values including a voltage and frequency according to an embodiment. The PCS control unit 10 may be based on active power, reactive power, frequency and voltage reference values and additionally calculate a power reserve margin (PRM) to finally calculate a control value for the charging and discharging and current control of the energy storage system.

The detailed configuration of the PCS control unit 10 is described with reference to FIG. 4.

The PCS control unit 10 according to an embodiment may include a droop control unit 110 and an active power calculation unit 120.

The droop control unit 110 may include a voltage calculation unit 111, a frequency calculation unit 112, and a PRM calculation unit 113.

The voltage calculation unit 111 may calculate the difference between a reference voltage and a measured voltage based on the measured voltage and the reference voltage applied to the PCS control unit 10. In particular, the voltage calculation unit 111 may obtain a measured voltage value measured from a system. It is possible to calculate the difference between the measured voltage value and a reference voltage value based on the measured voltage value and the reference voltage value or reference voltage value range including a normal voltage value. In this case, the reference voltage value or reference voltage value range may be a voltage value or voltage value range sensed under the normal operation of a power system. The voltage value or voltage value range has no limitation and may vary depending on the configuration and operation state of a device and system.

The frequency calculation unit 112 may calculate the difference between a reference frequency and a measured frequency based on the measured frequency and the reference frequency applied to the PCS control unit 10. In particular, the frequency calculation unit 112 may obtain an operating frequency value measured from a system. It is possible to calculate the difference between the measured frequency value and a reference frequency value based on the frequency value and the reference frequency value or reference frequency value range including a normal frequency value. In this case, the reference frequency value or reference frequency value range may be a frequency value or frequency value range sensed under the normal operation of a power system. The frequency value or frequency value range has no limitation and may vary depending on the configuration and operation state of a device and system.

The PRM calculation unit 113 may calculate a PRM based on a ratio of reserve power $P_{leftover}$ to the maximum consumption of power $P_{load}$.

In particular, the PRM calculation unit 113 may enable the calculated PRM to be added to the value calculated from the voltage calculation unit 111 and the frequency calculation unit 112 and output to the power calculation unit 120.

The PRM calculated from the PRM calculation unit 113 may be expressed and calculated by Expression 1 as below:

$$PRM(\%) = \frac{P_{leftover}(t)}{P_{load}(t)} \times 100 \qquad <\text{Expression 1}>$$

A coefficient value for calculating the PRM may be represented with a ratio of a reserve power $P_{leftover}$ value to maximum consumption.

When the output of a distributed power supply $P_{DG}$ and the output of the energy storage system $P_{ESS}$ are further used as load coefficients in Expression 1, Expression 2 may be obtained as below:

$$PRM(\%) = \frac{P_{leftover}(t)}{P_{load}(t) - P_{DG}(t) - P_{ESS}(t)} \times 100 \qquad <\text{Expression 2}>$$

That is, the PRM may be represented with a ratio of the power reserve value $P_{leftover}$ to the difference between the maximum consumption of power $P_{load}$ and loads defined as the output of the distributed power supply $P_{DG}$ and the output of the energy storage system $P_{ESS}$.

When Expression 2 is converted into an expression for the output power of the energy storage system, Expression 3 may be obtained as below:

$$P_{ESS} = \left\{ P_{load}(t) - P_{DG}(t) - \frac{100 \cdot P_{leftover}(t)}{PRM_{ref}(\%)} \right\} \cdot \frac{Ka}{n_{ESS\_P_{CS}}} \qquad <\text{Expression 3}>$$

In Expression 3, $n_{ESS\_P_{CS}}$ may be defined as the efficiency coefficient of an energy storage system PCS and Ka may be defined as a proportional factor for the PRM of the energy storage system.

Also, the PRM calculation unit 113 may also express Expressions for the PRM and the output power of the energy storage system expressed in Expressions 2 and 3, as in Expressions 4 and 5 as below:

$$PRM(\%) = \frac{P_G(t) - P_{load}(t) + P_{DG}(t) + P_{ESS}(t)}{P_{load}(t)} \times 100 \qquad <\text{Expression 4}>$$

As in Expression 4, the PRM may be represented with a ratio of a value obtained by adding the difference between the maximum amount of energy supply and the maximum consumption to the amounts of energy stored in a distributed power supply and the energy storage system, to the maximum consumption.

Also, when Expression 4 is converted into a value for the amount of energy, Expression 5 may be obtained as below:

$$P_{ESS} = \left[ \frac{\{1 + PRM_{ref}(\%)\} \cdot P_{load}}{100} - P_G(t) - P_{DG}(t) \right] \cdot \frac{Kb}{n_{ESS\_P_{CS}}} \qquad <\text{Expression 5}>$$

That is, as represented in Expressions 4 and 5 above, when reserve power is represented as the maximum amount of power supply $P_G$-maximum consumption $P_{load}$, the output of the distributed power supply and the output of the energy storage system may affect the maximum amount of power supply.

The PRM calculation unit 113 may determine a maximum amount of power supply based on the output of the distributed power supply and the output of the energy storage system and calculate the PRM with corresponding reserve power.

In particular, the PRM calculation unit 113 may calculate a control value for controlling the output of the energy storage system through Expression 3 or 5 according to the PRM calculated based on Expression 1 or 2. The control for the output of the energy storage system output from the PRM calculation unit 113 may be output to the power calculation unit 120.

The power calculation unit 120 may calculate the PRM of the energy storage system, and the difference between the reactive power QESS and active power $P_{ESS}$ values of the energy storage system and the reference reactive power and active power values at the droop control unit 110. In particular, the power calculation unit 120 may receive a voltage value and frequency value according to a system operation and active and reactive power according to the PRM value and output a PCS control value to be output to the PI control unit 20.

The PI control unit 20 may calculate a response characteristic by a proportional integral controller based on reactive and active power values output through the PCS control unit 10 including the droop control unit 110 and the power calculation unit 120.

The d-q conversion unit 30 and the PWM control unit 40 may perform d-q conversion in consideration of the response characteristic output from the PI control unit 20 and calculate a PWM signal for final power supply switching control.

Thus, the control of the energy storage system considering the PRM according to an embodiment may be controlling the maximum amount of power supply by further using reactive and active power, voltage and frequency values in addition to a coefficient value for the PRM. That is, it is possible to supply and cut off power by a switching control signal (duty ratio) for power supply based on the control value calculated according to an embodiment.

It is possible to control power charged and discharged at the energy storage system based on the switching signal for power supply and cut-off.

In the following, a device for controlling the charging and discharging of the energy storage system and a corresponding operation are described in detail with reference to FIG. 3.

FIG. 3 is a block diagram of a charging and discharging device of an energy storage system according to an embodiment.

Figure 2:
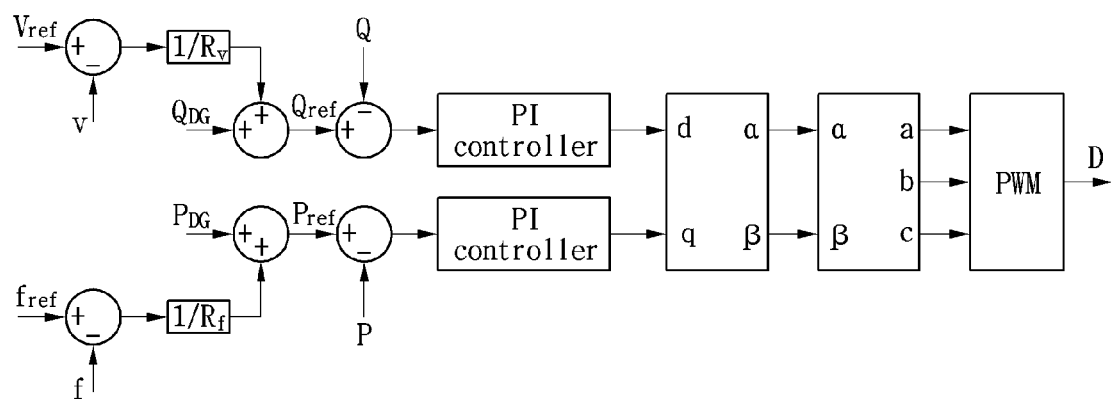

Referring to FIG. 3, the charging and discharging device according to an embodiment may apply the PRM calculated at the PRM calculation unit 113 in FIG. 2 and control charged and discharged amounts.

In particular, the charging and discharging device may calculate a switch open and close control value for charged and discharged amounts based on the PRM calculated by Expressions 2 to 5 and FIG. 4 as described above. Based on Expression 2, the PRM may be represented with a ratio of the reserve power value $P_{leftover}$ to the difference between the maximum consumption of power $P_{load}$ load and loads defined as the output of the distributed power supply $P_{DG}$ and the output of the energy storage system $P_{ESS}$. It is possible to calculate a difference in PRM with reference to the calculated PRM and a reference PRM $PRM_{ref}$.

The difference in PRM may be obtained by calculating the difference between the reference PRM $PRM_{ref}$ calculated at a PRM difference calculation unit 310 and the PRM calculated at the PRM calculation unit 113.

It is possible to calculate an energy ratio Qratio stored in the energy storage system with respect to the difference in the PRM calculated at the PRM difference calculation unit 310.

An operation coefficient calculation unit 320 may calculate a switch open and close operation coefficient for the energy charging and discharging of the energy storage system, according to the energy ratio Qratio of the energy storage system and the charged amount $ESS_{SOC}$ of the energy storage system.

An operation control unit 330 may perform control for adjusting the charged and discharged amounts of the energy storage system, based on the ratio of the energy storage system and PRM calculated at the operation coefficient calculation unit 320 and the charged amount of the energy storage system.

When controlling the operation of the energy storage system, the operation control unit 330 checks the limit SOC limiter 340 of the pre-charged amount, and may stop the discharging operation of the energy storage system when the charged amount of energy stored in the energy storage system is less than or equal to the limit, i.e., when the charged amount of energy stored in the energy storage system is less than or equal to a reference energy charged amount. It has been described that the limit of the charged amount is set to a specific value according to the present embodiment. However, the inventive concept has no limitation and the limit of the charged amount may be designated to be within a certain range including the specific value. That is, the limit may be set or designated to be within a charged-amount limit range including the minimum and maximum ranges of the limit. Thus, it is possible to adjust the charged and discharged amounts of the energy storage system according to the charged amount of the current energy storage system.

Embodiments are mainly described above. However, they are only examples and do not limit the inventive concept. A person skilled in the art may appreciate that many variations and applications not presented above may be implemented without departing from the essential characteristic of embodiments. For example, each component specifically represented in embodiments may vary. In addition, it should be construed that differences related to such a variation and such an application are included in the scope of the inventive concept defined in the following claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control device of an energy storage system, the control device comprising:
   a power conversion system (PCS) control unit configured to calculate a control value for charging and discharging the energy storage system; and
   a charging and discharging device configured to adjust charged and discharged amounts of energy of the energy storage system,
   wherein the PCS control unit comprises:
   a voltage calculation unit configured to calculate a difference between a reference voltage supplied to a system and a measured voltage received from the system;
   a frequency calculation unit configured to calculate a difference between a reference frequency supplied to the system and a measured frequency received from the system;
   a power reserve margin (PRM) calculation unit configured to calculate a PRM based on a ratio of reserve power to a maximum power consumption of the energy storage system;
   a power calculation unit configured to receive coefficients calculated by the voltage calculation unit, the frequency calculation unit and the PRM calculation unit and to calculate a switch control value of the energy storage system by using a difference between reactive power and active power;

a PRM difference calculation unit configured to calculate a difference between a value calculated by the PRM calculation unit and a reference PRM value;

an operation coefficient calculation unit configured to calculate an energy ratio of the energy storage system corresponding to the difference calculated by the difference calculation unit and to calculate a switch operation coefficient according to the charged amount of the energy storage system; and an operation control unit configured to adjust the charged and discharged amounts of energy of the energy storage system based on the calculated switch operation coefficient.

2. The control device according to claim 1, wherein the PRM is calculated as a ratio of the reserve power $P_{leftover}$ to a difference between the maximum power consumption $P_{load}$ and an output of a distributed power supply $P_{DG}$ and an output power of the energy storage system $P_{ESS}$ according to the following equation:

$$PRM(\%) = \frac{P_{leftover}(t)}{P_{load}(t) - P_{DG}(t) - P_{ESS}(t)} \times 100.$$

3. The control device of claim 2, wherein the PRM calculation unit is further configured to calculate $P_{ESS}$ based on a reference PRM $PRF_{ref}$, an efficiency coefficient $N_{ESS}$, and a proportional factor Ka according to the following equation:

$$P_{ESS} = \left\{ P_{load}(t) - P_{DG}(t) - \frac{100 \cdot P_{leftover}(t)}{PRM_{ref}(\%)} \right\} \cdot \frac{Ka}{n_{ESS\_P_{CS}}}.$$

4. The control device according to claim 3, wherein the PRM calculation unit is further configured to calculate a ratio of a sum of a difference between a maximum energy supply amount $P_G$ and $P_{load}$ and amounts of energy stored in the distributed power supply and the energy storage system to $P_{load}$ according to the following equation:

$$PRM(\%) = \frac{P_G(t) - P_{load}(t) + P_{DG}(t) + P_{ESS}(t)}{P_{load}(t)} \times 100.$$

5. The control device according to claim 4, wherein the PRM calculation unit is further configured to convert output power of the energy storage system into a value for amounts of energy according to the following equation:

$$P_{ESS} = \left[ \frac{\{1 + PRM_{ref}(\%)\} \cdot P_{load}}{100} - P_G(t) - P_{DG}(t) \right] \cdot \frac{Kb}{n_{ESS\_P_{CS}}}.$$

6. The control device according to claim 1, wherein the PRM calculation unit is further configured to:

determine a maximum amount of power supplied based on an output of a distributed power supply and an output of the energy storage system; and calculate the PRM using a corresponding reserve power amount.

7. The control device according to claim 1, further comprising a droop control unit configured to calculate voltage and frequency values as part of the PRM calculation.

8. The control device according to claim 1, wherein the operation control unit is further configured to stop discharging the energy storage system when the charged amount is less than or equal to a reference amount.

9. The control device according to claim 1, wherein:

the PRM difference calculation unit is further configured to calculate a difference between a ratio and the reference PRM value; and the ratio is of a sum of a difference between a maximum energy supply amount and the maximum power consumption and amounts of energy stored in a distributed power supply and the energy storage system to the maximum power consumption.

* * * * *